(12) United States Patent
Ouyang et al.

(10) Patent No.: US 9,880,444 B2
(45) Date of Patent: Jan. 30, 2018

(54) TM OPTICAL SWITCH WITH HIGH EXTINCTION RATIO BASED ON SLAB PHOTONIC CRYSTALS

(71) Applicant: Zhengbiao Ouyang, Shenzhen, Guangdong Province (CN)

(72) Inventors: Zhengbiao Ouyang, Shenzhen (CN); Guohua Wen, Shenzhen (CN)

(73) Assignee: Zhengbiao Ouyang, Shenzhen, Guangdong Province (CN)

(*) Notice: Subject to any disclaimer, the term of this patent is extended or adjusted under 35 U.S.C. 154(b) by 0 days.

(21) Appl. No.: 15/620,818

(22) Filed: Jun. 12, 2017

(65) Prior Publication Data

US 2017/0277015 A1  Sep. 28, 2017

Related U.S. Application Data

(63) Continuation of application No. PCT/CN2015/097053, filed on Dec. 10, 2015.

(30) Foreign Application Priority Data

Dec. 10, 2014 (CN) .......................... 2014 1 0756937

(51) Int. Cl.
*G02F 1/295* (2006.01)
*G02F 1/313* (2006.01)

(52) U.S. Cl.
CPC ........ *G02F 1/3133* (2013.01); *G02F 2201/06* (2013.01); *G02F 2202/32* (2013.01); *G02F 2203/07* (2013.01)

(58) Field of Classification Search
CPC ......... B82Y 20/00; G02F 1/225; G02F 1/295; G02F 1/3133; G02B 6/12007; G02B 6/1225
See application file for complete search history.

(56) References Cited

U.S. PATENT DOCUMENTS

| 7,421,179 | B1 | 9/2008 | Jiang et al. | |
|---|---|---|---|---|
| 7,428,348 | B2 * | 9/2008 | Prather | B82Y 20/00 385/129 |
| 7,529,437 | B2 * | 5/2009 | Spillane | B82Y 10/00 385/14 |

FOREIGN PATENT DOCUMENTS

| CN | 1514272 A | 7/2004 |
|---|---|---|
| CN | 104375267 A | 2/2015 |

(Continued)

OTHER PUBLICATIONS

Guohua Wen; Mi Lin; Natesan Yogesh; Zhengbiao Ouyang; "TM-Optical Switch Based on Modification of Photonic Band Gaps in Photonic Crystals", 2014 IEEE Workshop on Advanced Research and Technology in Industry Applications (WARTIA), 2014, pp. 1160 to 1162, IEEE.

*Primary Examiner* — Jennifer Doan
(74) *Attorney, Agent, or Firm* — Cheng-Ju Chiang

(57) ABSTRACT

The present invention discloses a TMOS with a high extinction ratio based on slab PhCs which comprises an upper slab PhC and a lower slab PhC connected as a whole; the upper slab PhC is called as a first square-lattice slab PhC, wherein the unit cell of the first square-lattice slab PhC includes a high-refractive-index rotating-square pillar, three first flat dielectric pillars and a background dielectric, and the first flat dielectric pillars includes a high-refractive-index dielectric pipe and a low-refractive-index dielectric, or of 1 to 3 high-refractive-index flat films, or of a low-refractive-index dielectric; the lower slab PhC is a second square-lattice slab PhC with a complete bandgap, the unit cell of the second square-lattice slab PhC includes a high-refractive-index rotating-square pillar, three second flat dielectric pillars and a background dielectric is a low-refractive-index dielectric and an normalized operating frequency of the TMOS is 0.4057 to 0.406.

10 Claims, 7 Drawing Sheets

(56) References Cited

FOREIGN PATENT DOCUMENTS

| CN | 104459989 A | 3/2015 |
|---|---|---|
| WO | 2016/091194 A1 | 6/2016 |

\* cited by examiner

TM OPTICAL SWITCH WITH HIGH EXTINCTION RATIO BASED ON SLAB PHOTONIC CRYSTALS

This application claims priority to Chinese Application No. 201410756937.1 filed on Dec. 10, 2014 and International Application No. PCT/CN2015/097053 filed on Dec. 10, 2015 and published in Chinese as International Publication No. WO/2016/091194 on Jun. 16, 2016, the entire contents of which are hereby incorporated by reference.

FIELD OF THE INVENTION

The present invention relates generally to a TM optical switch (TMOS) with a high extinction ratio (EXR), and specifically to a broadband TMOS with a high EXR based on slab photonic crystals (PhCs) with absolute photonic bandgaps (PBGs).

BACKGROUND OF THE INVENTION

In recent years, with the advent of information age, the speed and amount of information of required for communication technology increase dramatically. Optical communication technologies add wings to the information age, but the information processing of nodes and routes still need electronic circuits at present, which restricts the development of communication technologies in terms of speed, capacity and power consumption. Adopting photonic integrated circuits to replace or partially replace electronic integrated circuits for communication routes certainly will become the future direction of development.

A PhC is a structure material in which dielectric materials are arranged periodically in space, and is usually an artificial crystal consisting of two or more materials having different dielectric constants.

The electromagnetic modes in an absolute PBG cannot exist completely, so when an electronic energy band is overlapped with the absolute PBG of PhCs, spontaneous radiation is suppressed. The PhC having the absolute PBG can control spontaneous radiation, thereby changing the interaction between the fields and the materials and further improving the performance of optical devices.

Tunable PBGs can be applied to information communication, display and storage. For modulating bandgaps at high speeds by using external driving sources, many solutions have been proposed, e.g., controlling magnetic permeability by using a ferromagnetic material, and changing dielectric constant d by using a ferroelectric material.

Most of the existing optical switches are realized by using a nonlinear effect, which requires the use of high-power light for control, thus it will inevitably consume a large amount of energy. In the presence of large-scale integrated system and a large number of communication users, the consumption of energy will become enormous. At the same time, the degree of polarization (DOP) will affect signal-to-noise ratio and transmission speed.

SUMMARY OF THE INVENTION

The present invention is aimed at overcoming the defects of the prior art and providing a TMOS with a high EXR facilitating integration based on slab PhCs.

The aim of the present invention is realized by the following technical solution.

A TMOS with a high EXR based on PhC slabs in the present invention comprises an upper slab PhC and a lower slab PhC connected as a whole; the upper slab PhC is a first square-lattice slab PhC, the unit cell of the first square-lattice slab PhC includes a high-refractive-index rotating-square pillar, three first flat dielectric pillars and a background dielectric; the first flat dielectric pillars are arranged horizontally, the first flat dielectric pillars enable an overall upper slab PhC to form as a whole, and the first flat dielectric pillars includes a high-refractive-index dielectric pipe and a low-refractive-index dielectric, or 1 to 3 high-refractive-index flat film, of a low refractive dielectric; the lower slab PhC is a second square-lattice slab PhC, the unit cell of the second square-lattice slab PhC includes a high-refractive-index rotating-square pillar, three second flat dielectric pillar sand a background dielectric, the second flat dielectric pillars are arranged horizontally, the second flat dielectric pillar senable an overall lower slab PhC to form as a whole, and the second flat dielectric pillars are high-refractive-index dielectric pillars; the background dielectric is a low-refractive-index dielectric; and a TM bandgap normalized frequency is 0.405 to 0.457.

One of three first flat dielectric pillars of the first square-lattice slab PhC is located at the horizontal middle of a center of said rotating-square pillar, a remaining two first flat dielectric pillars are parallel to the first flat dielectric pillar in the horizontal middle respectively, and a distance of the remaining two at a left and right is 0.25 a, where a is the lattice constant of the PhC; and wherein one of three second flat dielectric pillars of the second square-lattice slab PhC is located at the horizontal middle of a center of the rotating-square pillar, the remaining two second flat dielectric pillars are parallel to the second flat dielectric pillar in the horizontal middle respectively, and the distance of the remaining two second flat dielectric pillars at a left and right is 0.25 a.

The side lengths of the high-refractive-index rotating-square pillars of the first and second square-lattice slab PhCs are respectively 0.5 a to 0.65 a, and their rotating angles are 0° to 90°; and the widths of the first and second flat dielectric pillars of the first and second square-lattice slab PhCs are respectively 0.023 a to 0.039 a.

The thickness of the pipe wall in the first flat dielectric pillar in the unit cell of the first square-lattice slab PhCs is 0-0.009 a; and a width of the low-refractive-index dielectric in the pipe is the difference between the width of the first flat dielectric pillar and the thickness of the pipe.

The high-refractive-index dielectric is silicon, gallium arsenide, titanium dioxide or a different dielectric having a refractive index of more than 2.

The low-refractive-index dielectric is vacuum, air, cryolite, silica, organic foam, olive oil or a different dielectric having a refractive index of less than 1.5; and the low-refractive-index dielectric is air.

The frequency range of the TMOS is 0.4 to 0.49, an state that the first square-lattice slab PhC is located in an optical channel (OCH) and the second square-lattice slab PhC is located outside the OCH is the optically connected state; and another state that the second square-lattice slab PhC is located in the OCH and the first square-lattice slab PhC is located outside the OCH is the optically disconnected state.

The frequency range of the TMOS is 0.405 to 0.457, the bandwidth is 0.0517 and the EXR is 42 dB to −57 dB.

Positions of the first and second square-lattice slab PhC in the OCHs are adjusted by external forces, including mechanical, electrical and magnetic forces.

Compared with the prior art, the present invention has the following positive effects. The optical switch is an indispensable component in an integrated OCH and is very important for high-speed operation of a network, and large bandwidth, low energy loss, high DOP and high EXR are important parameters for evaluating switches.

1. The functions of the optical switch are realized by adjusting the positions of the first square-lattice slab PhC (the upper slab PhC) and the second square-lattice slab PhC (the lower slab PhC) in the OCH.

2. The structure of the present invention enables a TMOS with a high EXR.

3. The TMOS with a high EXR based on slab PhCs facilitates integration.

These and other objects and advantages of the present invention will become readily apparent to those skilled in the art upon reading the following detailed description and claims and by referring to the accompanying drawings.

BRIEF DESCRIPTION OF THE FIGURES

FIG. 1 (b) is a structural schematic diagram of a unit cell of a lower slab PhC of the TMOS of the present invention.

FIG. 2 (b) is a structural schematic diagram of a second implementation of the TMOS with a high EXR based on slab PhCs.

FIG. 2(c) is a structural schematic diagram of a third implementation of the TMOS with a high EXR based on slab PhCs.

The present invention is more specifically described in the following paragraphs by reference to the drawings attached only by way of example.

DESCRIPTION OF THE PREFERRED EMBODIMENTS

The terms a or an, as used herein, are defined as one or more than one, The term plurality, as used herein, is defined as two or more than two. The term another, as used herein, is defined as at least a second or more.

The present invention will be further described in detail below in combination with the accompanying drawings and specific embodiments.

Figure 1:
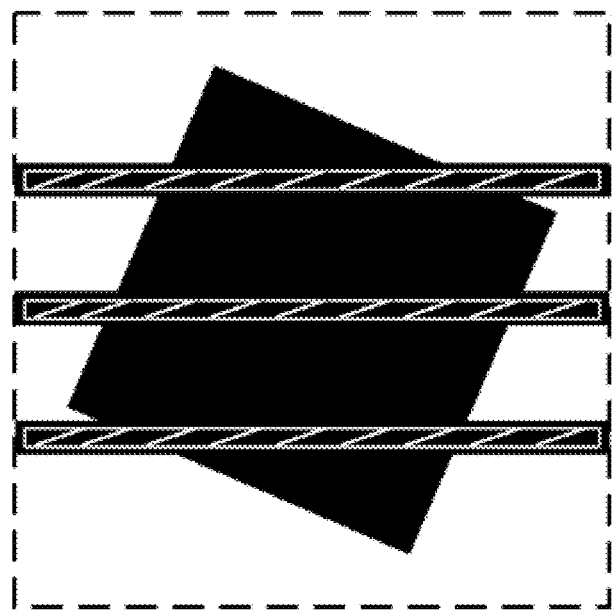
FIG. 1 (a) is a structural schematic diagram of a unit cell of an upper slab PhC of a TMOS of the present invention.
Figure 1:
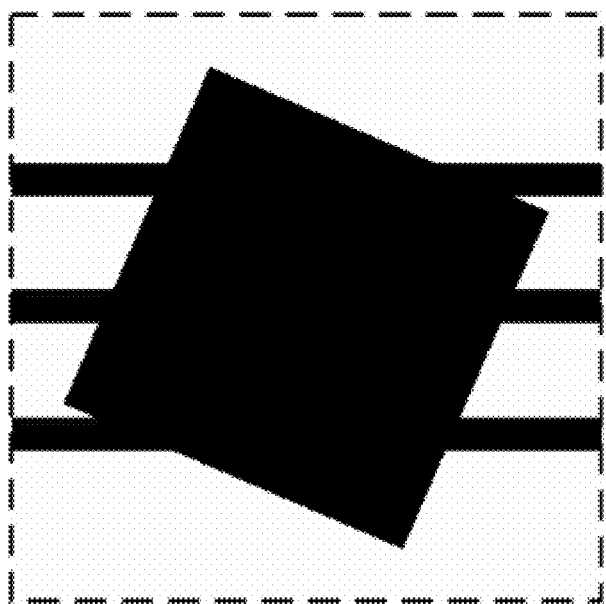

A TMOS with a high EXR based on slab PhCs in the present invention, as shown in FIG. 1 (a), includes an upper slab PhC and a lower slab PhC connected as a whole; the upper slab PhC is a first square-lattice slab PhC, the unit cell of the first square-lattice slab PhC includes a high-refractive-index rotating-square pillar, the three first flat dielectric pillars and a background dielectric, the first flat dielectric pillars are arranged horizontally, the first flat dielectric pillars enable the overall upper slab PhC to form as a whole, and the first flat dielectric pillars are included of a high-refractive-index dielectric pipe and a low-refractive-index dielectric in the pipe, of 1 to 3 high-refractive-index flat films, of the low-refractive-index dielectric; as shown in FIG. 1 (b), the lower slab PhC is a second square-lattice slab PhC, the unit cell of the second square-lattice slab PhC includes a high-refractive-index rotating-square pillar, the three second flat dielectric pillars and a background dielectric, the second flat dielectric pillars are arranged horizontally, the second flat dielectric pillars enable the overall lower slab PhC to form as a whole, the second flat dielectric pillars are high-refractive-index dielectric pillars, and the high-refractive-index dielectric is silicon, gallium arsenide, titanium dioxide or a different dielectric having a refractive index of more than 2, and the high-refractive-index dielectric adopts a silicon material; the background dielectric is the low-refractive-index dielectric, and the low-refractive-index dielectric is vacuum, air, cryolite, silica, organic foam, olive oil or a different dielectric having a refractive index of less than 1.5. The normalized frequency (a/λ) of the TM bandgap is 0.405 to 0.457, and this frequency range is either the TM transmission band of the first square-lattice slab PhC and the TM band gap of the second square-lattice slab PhC, or the TM transmission band of the second square-lattice slab PhC and the TM bandgap of the first square-lattice slab PhC, wherein a is a lattice constant of the first and second square-lattice slab PhCs, and λ is the wavelength of incident wave.

The frequency (a/λ) range of the TMOS with a high EXR is 0.405 to 0.457, bandwidth (a/λ) up to 0.0517 and EXR up to −42 dB to −57 dB, wherein a is a lattice constant, and λ is the wavelength of incident wave. For the frequency (a/λ) range of the TMOS with a high EXR is 0.4 to 0.49, the state wherein the first square-lattice slab PhC is located in the OCH and the second square-lattice slab PhC is located outside the OCH is an optically connected state; and the state wherein the square-lattice slab PhC is located in the OCH and the first square-lattice slab PhC is located outside the OCH is an optically is connected state.

The EXR of the TMOS is a ratio of the output optical powers of the TMOS in the two states.

A structural schematic diagram of a first implementation of the TMOS with a high EXR based on slab PhCs.

Figure 2:
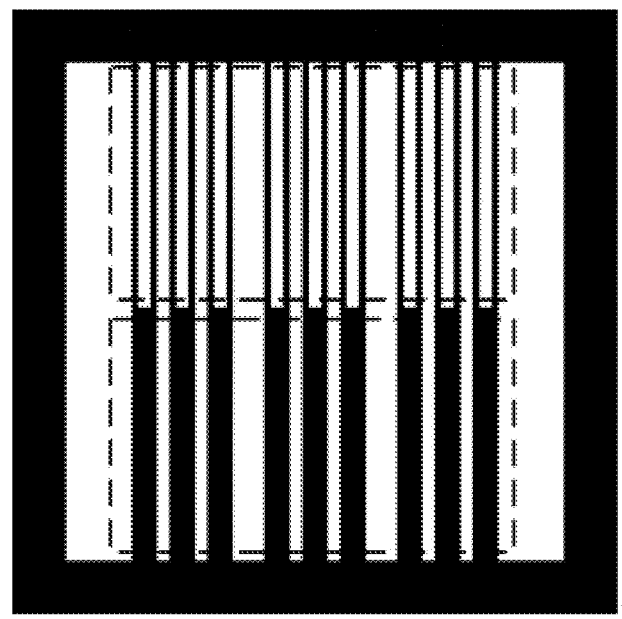
FIG. 2 (a) is a structural schematic diagram of a first implementation of the TMOS with a high EXR based on slab PhCs.
Figure 2:
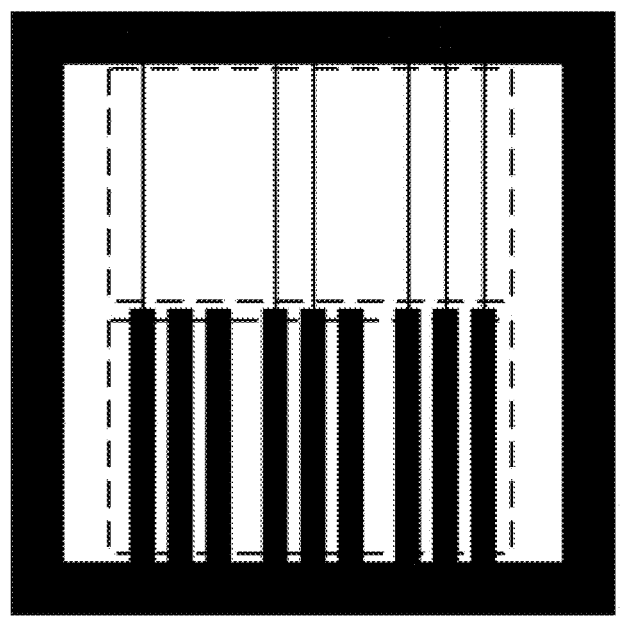
Figure 2:
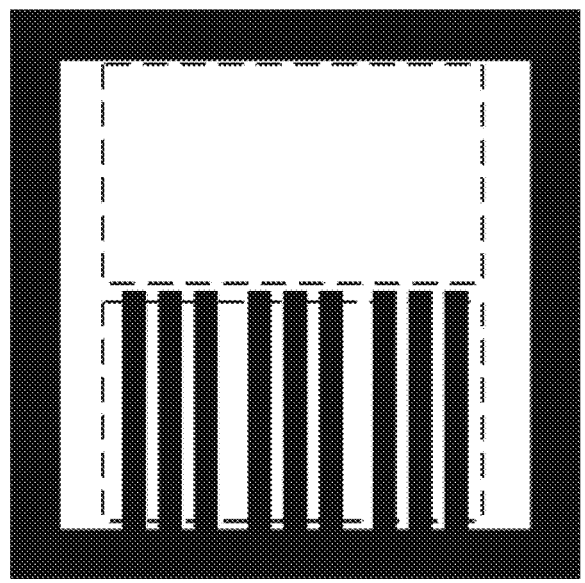

The TMOS includes an upper slab PhC and a lower slab PhC connected as a whole; as shown in FIG. 2 (a), rotating-square pillars in PhC are omitted, and the dashed box shows the position of a rotating-square pillar array; the upper slab PhC is a first square-lattice slab PhC, the unit cell of the first square-lattice slab PhC includes a high-refractive-index rotating-square pillar, the three first flat dielectric pillars and a background dielectric, the first flat dielectric pillars enable the overall upper slab PhC to form as a whole, one of three first flat dielectric pillars in the unit cell of a first square-lattice slab PhC is located at the horizontal middle of the center of the rotating-square pillar, the remaining two first flat dielectric pillars are parallel to the first flat dielectric pillar in the horizontal middle respectively, and the distance of the remaining two at the left and right is 0.25 a; the first flat dielectric pillar includes a high-refractive-index pipe and a low-refractive-index dielectric medium in the pipe, the thickness of the pipe wall in the first flat dielectric pillar in the unit cell of the first square-lattice slab PhC is 0 to 0.009 a; and the width of the low-refractive-index dielectric in the pipe is the difference between the width of the first flat dielectric pillar and the thickness of the pipe wall. The lower slab PhC is a second flat dielectric pillar PhC, the unit cell of the second flat dielectric pillar PhC includes a high-refractive-index rotating-square pillar, the three second flat dielectric pillars and a background dielectric, the second flat dielectric pillars are arranged horizontally, the second flat dielectric pillars enable the overall lower slab PhC to form as a whole, one of three second flat dielectric pillars of a second square-lattice slab PhC is located at the horizontal middle of the center of the rotating-square pillar, the remaining two second flat dielectric pillars are parallel to the second flat dielectric pillar the horizontal middle respectively, and the distance of the remaining two at the left and right is 0.25 a. The side lengths of the high-refractive-index rotating-square pillars of the first and second square-lattice slab PhCs are respectively 0.50 a to 0.65 a, their rotating angles are 0° to 90°, and the widths of the first and second flat dielectric pillars in the unit cell of the first and second square-lattice slab PhCs are respectively 0.023 a to 0.039 a, wherein a is a lattice constant of the first and second slab square-lattice PhCs; the second flat dielectric pillar is a high-refractive-index dielectric pillar, the high-refractive-index dielectric is silicon, gallium arsenide, titanium dioxide or a different dielectric having a refractive index of more than 2, and the high-refractive-index dielectric adopts a silicon material; the background dielectric is a low-refractive-index dielectric, and the low-refractive-index dielectric is vacuum, air, cryolite, silica, organic foam, olive oil or a different dielectric having a refractive index of less than 1.5, the TM bandgap normalized frequency (a/λ) is 0.405 to 0.457, and this frequency band is either the TM transmission band of the first square-lattice slab PhC and the TM bandgap of the second square-lattice slab PhC, or the TM transmission band of the second square-lattice slab PhC and the TM bandgap of the first square-lattice slab PhC, wherein a is a lattice constant of the first and second square-lattice slab PhCs, and λ is the wavelength of incident wave.

A structural schematic diagram of a second implementation of the TMOS with a high EXR based on slab PhCs.

The TMOS includes an upper slab PhC and a lower slab PhC connected as a whole; as shown in FIG. 2 (b), rotating-square pillars in PhC are omitted in the figure, and the dashed box shows the position of a rotating-square pillar array; the upper slab PhC is a first square-lattice slab PhC, the unit cell of the first square-lattice slab PhC includes a high-refractive-index rotating-square pillar, the three first flat dielectric pillars and a background dielectric, the first flat dielectric pillars are arranged horizontally, one of three first flat dielectric pillars in the unit cell of a first square-lattice slab PhC is located at the horizontal middle of the center of the rotating-square pillar, the remaining two first slab medium pillars are parallel to the first flat dielectric pillar in the horizontal middle respectively, and the distance of the remaining two at the left and right is 0.25 a; the first flat dielectric pillars enables the overall upper slab PhC to form as a whole, and the first flat dielectric pillars are included of three high-refractive-index flat films; the lower lab PhC is a second square-lattice slab PhC, the unit cell of the second square-lattice slab PhC includes a high-refractive-index rotating-square pillar, the three second flat dielectric pillars and a background dielectric, the second flat dielectric pillars are arranged horizontally, one of three second flat dielectric pillars of a second square-lattice slab PhC is located at the horizontal middle of the center of the rotating-square pillar, the remaining two second flat dielectric pillars are parallel to the second flat dielectric pillar in the horizontal middle respectively, and the distance of the remaining two at the left and right is 0.25 a; the second flat dielectric pillars enables the overall lower slab PhC to form as a whole, the first flat dielectric pillar and the second flat dielectric pillar of the first and second square-lattice slab PhCs are respectively spaced 0.2 a from the centers of the rotating-square pillars, the side lengths of the high-refractive-index rotating-square pillars of the first and second square-lattice slab PhCs are respectively 0.50 a to 0.65 a, their rotating angles are 0° to 90°, and the widths of the first and second flat dielectric pillars in the unit cell of the first and second square-lattice slab PhCs are respectively 0.023 a to 0.039 a, wherein a is a lattice constant of the first and second square-lattice slab PhCs. The second flat dielectric pillar is a high-refractive-index dielectric pillar, the high-refractive-index dielectric pillar is silicon, gallium arsenide, titanium dioxide or a different dielectric having a refractive index of more than 2, and the high-refractive-index dielectric adopts a silicon material; the background dielectric is a low-refractive-index dielectric, and the low-refractive-index dielectric is vacuum, air, cryolite, silica, organic foam, olive oil or a different dielectric having a refractive index of less than 1.5, the TM bandgap normalized frequency (a/λ) is 0.405 to 0.457, and this frequency band is either the TM transmission band of the first square-lattice slab PhC and the TM bandgap of the second square-lattice slab PhC, or the TM transmission band of the second square-lattice slab PhC and the TM bandgap of the first square-lattice slab PhC, wherein a is a lattice constant of the first and second square-lattice slab PhCs, and λ is the wavelength of incident wave.

A structural schematic diagram of a third implementation of the TMOS with a high EXR based on slab PhCs.

The TMOS includes an upper slab PhC and a lower slab PhC connected as a whole; as shown in FIG. 2(C), rotating-square pillars in PhC are omitted in the figure, and the dashed box shows the position of a rotating-square pillar array. The upper slab PhC is a first square-lattice slab PhC, the unit cell of the first square-lattice slab PhC includes a high-refractive-index rotating-square pillar, a single first flat dielectric pillar and a background dielectric, the first flat dielectric pillar includes a low-refractive-index dielectric, the background dielectric is low-refractive-index dielectric, the three slot is formed in the high-refractive-index rotating-square pillar and is filled with the low-refractive-index dielectric, and the low-refractive-index dielectric is vacuum, air, cryolite, silica, organic foam, olive oil or a different dielectric having a refractive index of less than 1.5, e.g., the slot is filled with air. The lower slab PhC is a second square-lattice slab PhC, the unit cell of the second square-lattice slab PhC includes a high-refractive-index rotating-square pillar, the three second flat dielectric pillars and a background dielectric, the second flat dielectric pillars are arranged horizontally, the second flat dielectric pillars enable the overall lower slab PhC to form as a whole, one of three second flat dielectric pillars of a second square-lattice slab PhC is located at the horizontal middle of the center of the rotating-square pillar, the remaining two second flat dielectric pillars are parallel to the second flat dielectric pillar at the horizontal middle respectively, and the distance of the remaining two at the left and right is 0.25 a. The side lengths of the high-refractive-index rotating-square pillars of the second lattice slab PhCs are respectively 0.50 a to 0.65 a, and their rotating angle are 0° to 90°, and the widths of the second flat dielectric pillars in the unit cells of the second square-lattice slab PhCs are 0.023 a to 0.039 a, wherein a is a lattice constant of the second square-lattice slab PhC; the second flat dielectric pillars are high-refractive-index dielectric pillars, the high-refractive-index dielectric is silicon, gallium arsenide, titanium dioxide or a differ dielectric having a refractive index of more than 2; the background dielectric is a low-refractive-index dielectric; the TM bandgap normalized frequency (a/λ) is 0.405 to 0.457, and this frequency range is either the TM transmission band of the first square-lattice slab PhC and the TM bandgap of the second square-lattice slab PhC, or the TM transmission band of the second square-lattice slab PhC and the TM bandgap of the first square-lattice slab PhC, wherein a is a lattice constant of the first and second square-lattice slab PhCs, and λ is the wavelength of incident wave.

The afore said three implementations all take a paper surface as the reference plane, and the upper and lower slab PhCs are connected as a whole by a frame and move vertically under the action of external forces to realize the functions of the TMOS, as shown in FIG. 2, the dashed box shows the position of a rotating-square pillar array in the figure. Because the frame itself is not on the light input and output planes, i.e., the light input and output planes are parallel to the reference plane, the propagation of light is not influenced. The vertical movement of the upper and lower slab PhCs serving as a whole can be realized by micromechanical, electrical and magnetic forces. For example, a magnet may be embedded into the frame, a pressure adopt a linkage device is connected with the frame; the pressure can thus drive the black frame to move up and down, and the left and right sides of the frame are located in a groove guide rail to guarantee that the black frame moves vertically, linearly and reciprocally.

Embodiment 1

Figure 3:
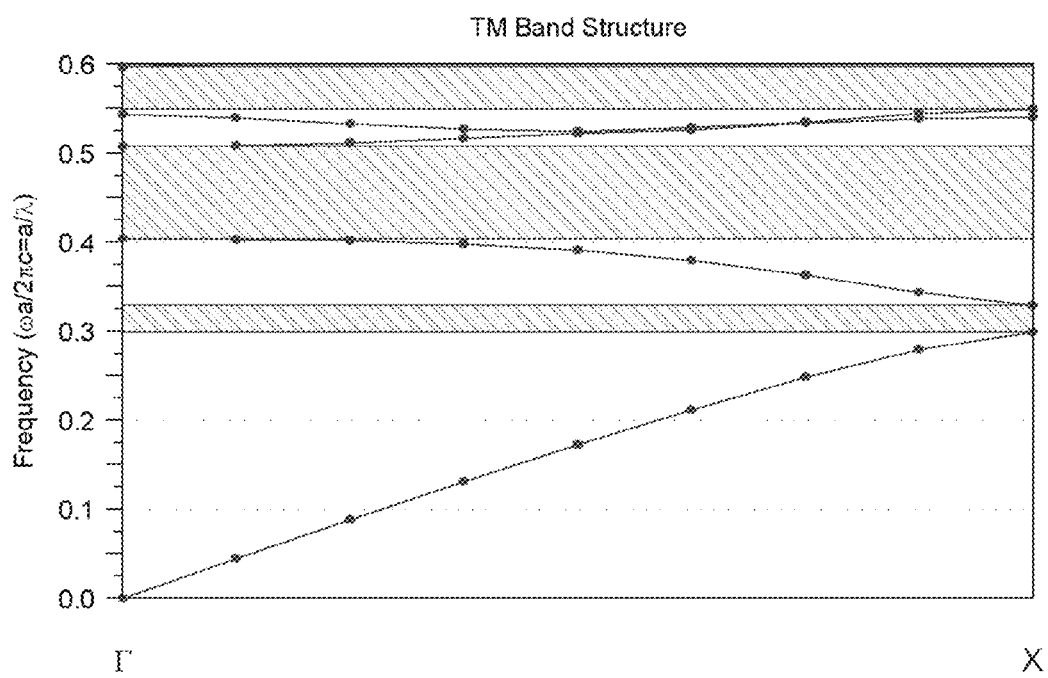
FIG. 3 is a photonic band map of the second square-lattice slab PhC shown in embodiment 1.
Figure 4:
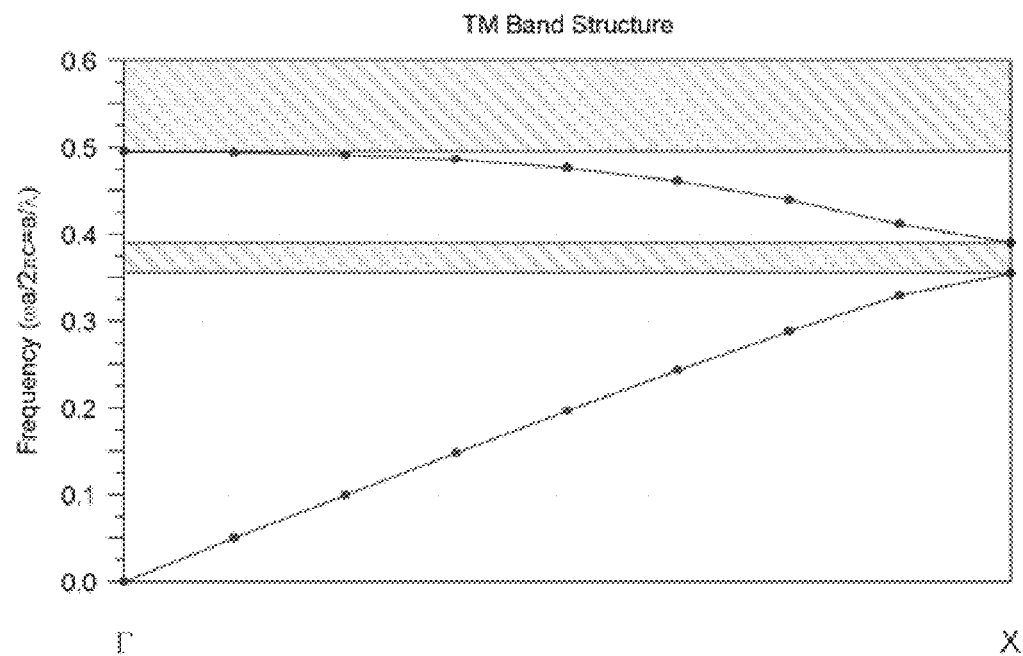
FIG. 4 is photonic band map of the first square-lattice slab PhC shown in embodiment 1.

In this embodiment, different structural diagrams of photonic bands in a horizontal direction are obtained through the first and second slab square-lattice PhCs, FIG. 3 is a structural diagram of a photonic band of the second slab square-lattice PhC, the TM bandgap normalization frequency (a/λ) is 0.4071 to 0.4908, FIG. 4 is a structural diagram of a photonic band of the first square-lattice slab PhC, TM bandgap normalized frequency (a/λ) is 0.4948 to 0.6254, and it can be known by comparison that for the frequency (a/λ) range being 0.4071 to 0.4908, this structure enables a TMOS with a high EXR.

Embodiment 2

Figure 5:
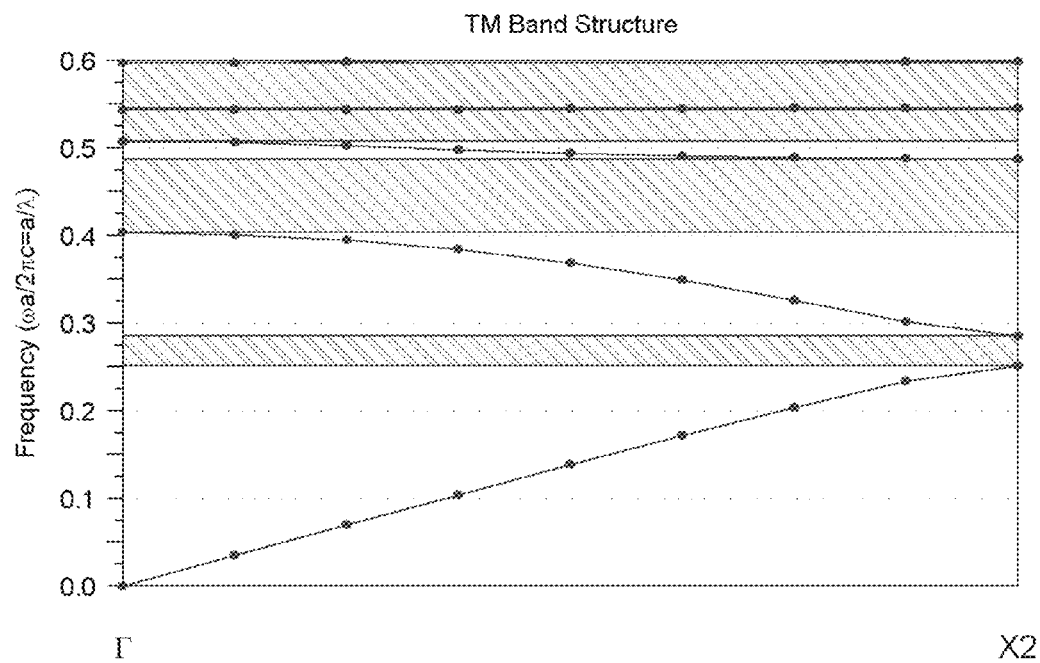
FIG. 5 is photonic band map of the second square-lattice slab PhC shown in embodiment 2.
Figure 6:
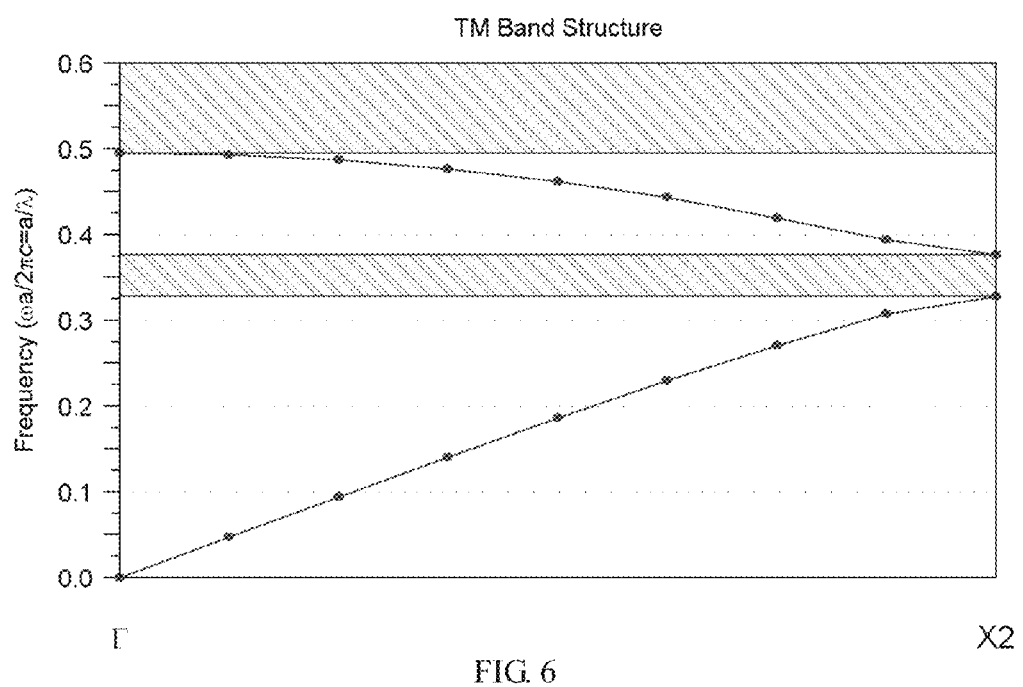
FIG. 6 is photonic band map of the first square-lattice slab PhC shown in embodiment 2.

In this embodiment, different structural diagrams of photonic bands in a vertical direction are obtained through the first and second square-lattice slab PhCs, FIGS. 5(a) and 5(b) is a structural diagram of a photonic band of the second square-lattice slab PhC, the TM bandgap normalization frequency (a/λ) is 0.4071 to 0.4908, FIGS. 6(a) and 6(b) is a structural diagram of a photonic band of the first square-lattice slab PhC, TM bandgap normalized frequency (a/λ) is 0.4948 to 0.6254, and it can be known by compare is on that for the frequency (a/λ) range being 0.4071 to 0.4908, this structure enables a TMOS with a high EXR.

Embodiment 3

Figure 7:
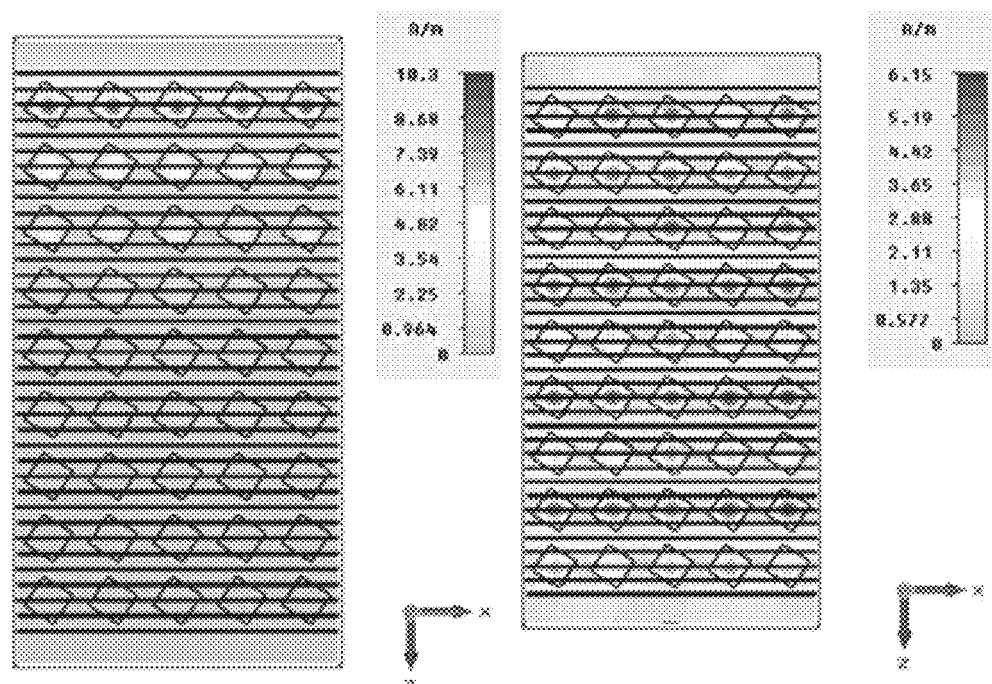
FIG. 7 is a TM field distribution diagram of the normalized frequency of the TMOS with a high EXR is 0.405 as shown in embodiment 3.

In this embodiment, the frequency (a/λ) range is 0.405 to 0.457, f (a/λ) is 0.405. By verifying with three-dimensional (3D) structure parameters for nine layers of high-refractive-index rotating dielectric pillars and thirty-seven layers of high-refractive-index dielectric veins, the result is indicated in FIGS. 7(a) and 7(b). It can be known from FIGS. 7(a) and 7(b) that: the TMOS has good extinction effect.

Embodiment 4

Figure 8:
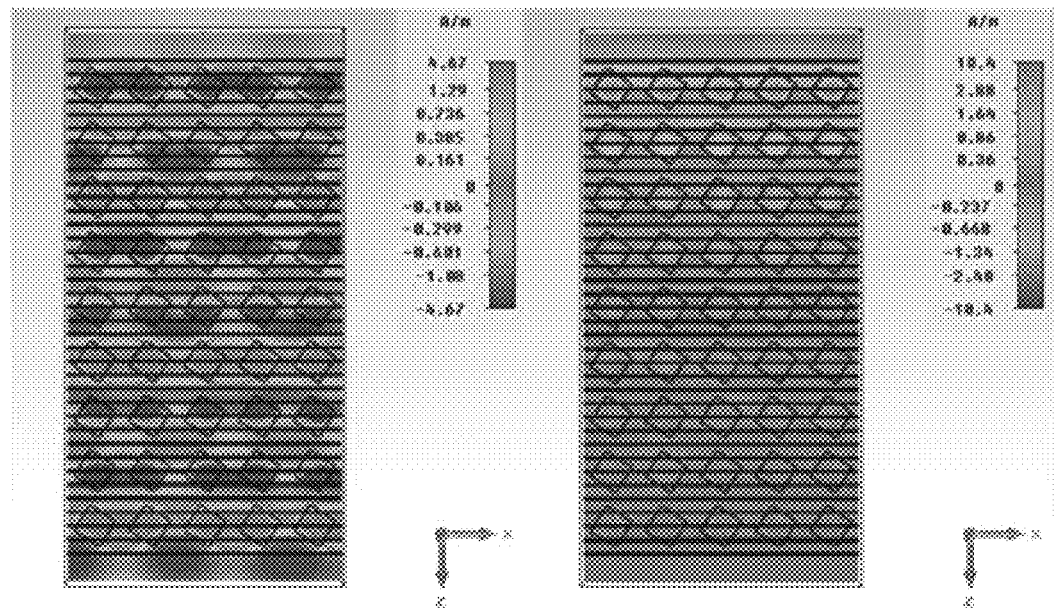
FIG. 8 is a TM field distribution diagram of the normalized frequency of the TMOS with a high EXR is 0.4074 as shown in embodiment 4.

In this embodiment, the frequency (a/λ) range is 0.405 to 0.457, f (a/λ) is 0.4074. By verifying with 3D structure parameters for nine layers of high-refractive-index rotating dielectric pillars and thirty-seven layers of high-refractive-index dielectric veins, the result is indicated in FIGS. 8(a) and 8(b). It can be known from FIGS. 8(a) and 8(b) that: the TMOS has good extinction effect.

Embodiment 5

Figure 9:
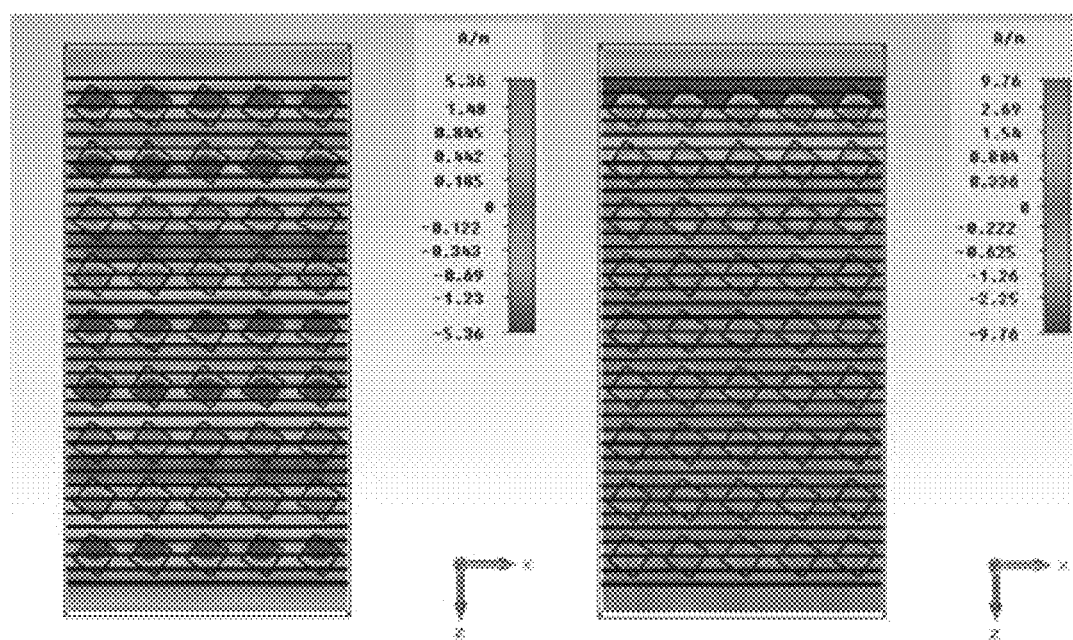
FIG. 9 is a TM field distribution diagram of the normalized frequency of the TMOS with a high EXR is 0.4316 as shown in embodiment 5.

In this embodiment, the frequency (a/λ) range is 0.405 to 0.457, f (a/λ) is 0.4316. By verifying with 3D structure parameters for nine layers of high-refractive-index rotating dielectric pillars and thirty-seven layers of high-refractive-index dielectric veins, the result is indicated in FIGS. 9(a) and 9(b). It can be known from FIGS. 9(a) and 9(b) that: the TMOS has good extinction effect.

Embodiment 6

Figure 10:
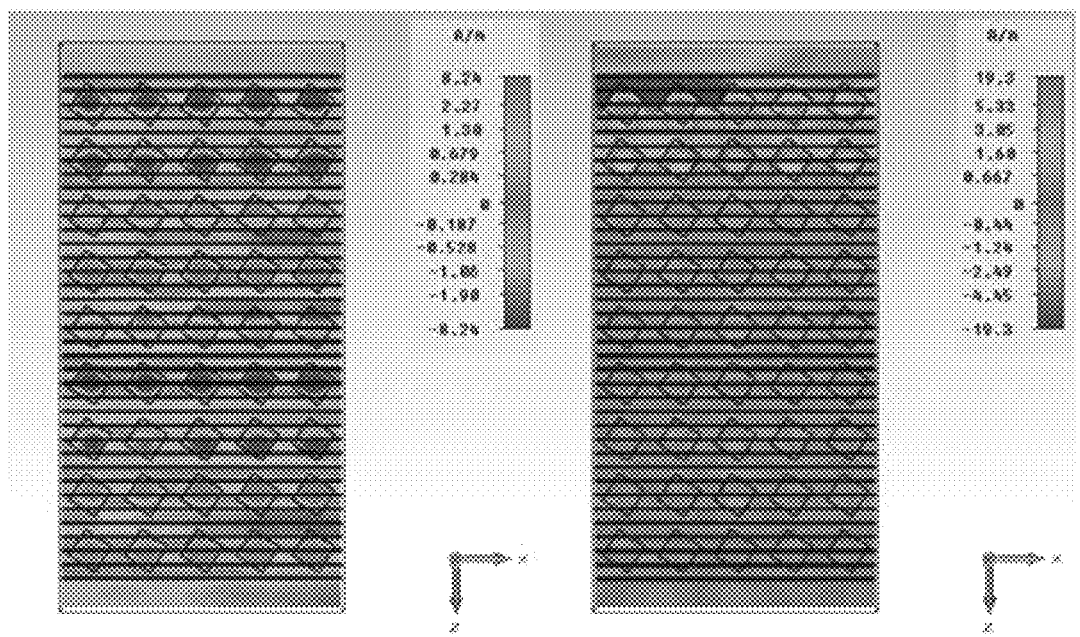
FIG. 10 is a TM field distribution diagram of the normalized frequency of the TMOS with a high EXR is 0.4436 as shown in embodiment 6.

In this embodiment, the frequency (a/λ) range is 0.405 to 0.457, f (a/λ) is 0.4436. By verifying with 3D structure parameters for nine layers of high-refractive-index rotating dielectric pillars and thirty-seven layers of high-refractive-index dielectric veins, the result is indicated in FIGS. 10(a) and 10(b). It can be known from FIGS. 10(a) and 10(b) that: the TMOS has good extinction effect.

Embodiment 7

Figure 11:
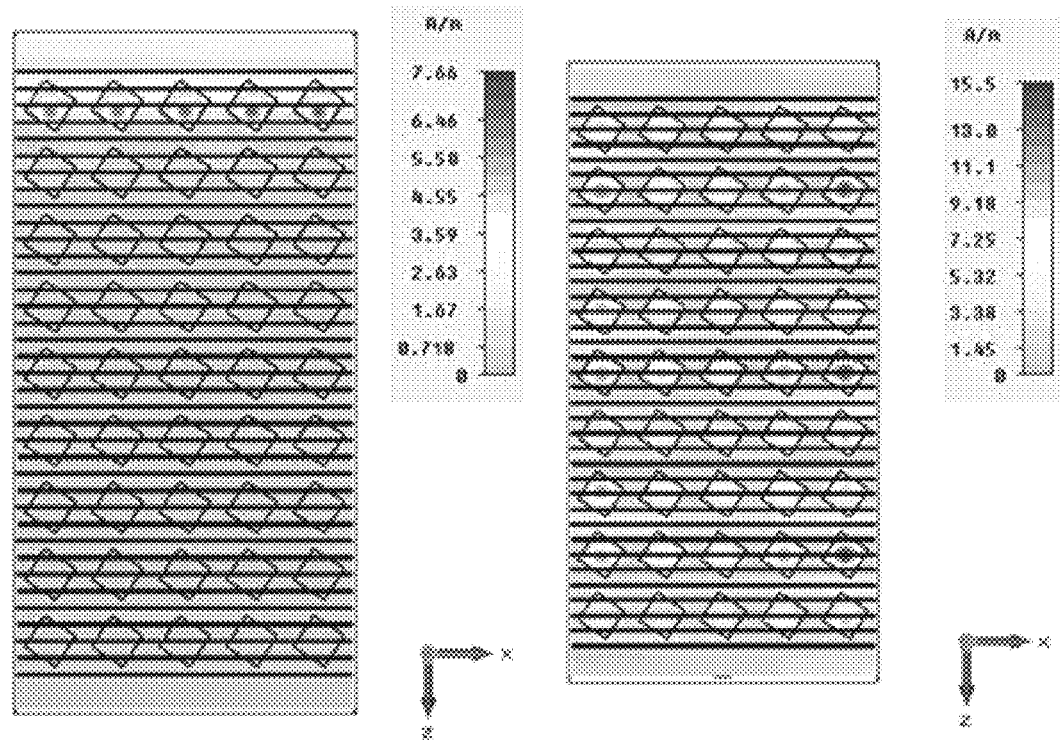
FIG. 11 is a TM field distribution diagram of the normalized frequency of the TMOS with a high EXR is 0.457 as shown in embodiment 7.

In this embodiment, the frequency (a/λ) range is 0.405 to 0.457, f (a/λ) is 0.457. By verifying with 3D structure parameters for nine layers of high-refractive-index rotating dielectric pillars and thirty-seven layers of high-refractive-index dielectric veins, the result is indicated in FIGS. 11(a) and 11(b). It can be known from FIGS. 11(a) and 11(b) that: the TMOS has good extinction effect.

While the invention has been described in terms of various specific embodiments, those skilled in the art will recognize that the invention can be practiced with modification within the spirit and scope of the claims.

What is claimed is:

1. A TMOS with a high EXR based on slab PhCs, wherein said a TMOS with a high EXR based on slab PhCs comprising:

an upper slab PhC and a lower slab PhC connected as a whole; said upper slab PhC is a first square-lattice slab PhC, the unit cell of said first square-lattice slab PhC includes a high-refractive-index rotating-square pillar, three first flat dielectric pillars and a background dielectric; said first flat dielectric pillars are arranged horizontally, said first flat dielectric pillars enable an overall upper slab PhC to form as a whole, and said first flat dielectric pillars includes a high-refractive-index dielectric pipe and a low-refractive-index dielectric, or 1 to 3 high-refractive-index dielectric flat film, or a low refractive dielectric; said lower slab PhC is a second square-lattice slab PhC, the unit cell of said second square-lattice slab PhC includes a high-refractive-index rotating-square pillar, three second flat dielectric pillars and a background dielectric, said second flat dielectric pillars are arranged horizontally, said second flat dielectric pillars enable an overall lower slab PhC to form as a whole, and said second flat dielectric pillars are high-refractive-index dielectric pillars; said background dielectric is a low-refractive-index dielectric; and a TM bandgap normalized frequency is 0.405 to 0.457.

2. The TMOS with a high EXR based on slab PhCs, according to claim 1 in which one of three first flat dielectric pillars of said first square-lattice slab PhC is located at the horizontal middle of a center of said rotating-square pillar, a remaining two first flat dielectric pillars are parallel to said first flat dielectric pillar in the horizontal middle respectively, and a distance of the remaining two at a left and right is 0.25 a, where a is the lattice constant of the PhC; and wherein one of three second flat dielectric pillars of said second square-lattice slab PhC is located at the horizontal middle of a center of said rotating-square pillar, the remaining two second flat dielectric pillars are parallel to said second flat dielectric pillar in the horizontal middle respectively, and a distance of the remaining two second flat dielectric pillars at a left and right is 0.25 a.

3. The TMOS with a high EXR based on slab PhCs, according to claim 1 in which the side lengths of said high-refractive-index rotating-square pillars of said first and second square-lattice slab PhCs are respectively 0.5 a to 0.65 a, and their rotating angles are 0° to 90°; and the widths of said first and second flat dielectric pillars of said first and second square-lattice slab PhCs are respectively 0.023 a to 0.039 a.

4. The TMOS with a high EXR based on slab PhCs, according to claim 1 in which the thickness of the pipe wall in said first flat dielectric pillar in the unit cell of said first square-lattice slab PhCs is 0-0.009 a; and a width of said low-refractive-index dielectric in the pipe is the difference between the width of said first flat dielectric pillar and the thickness of the pipe.

5. The TMOS with a high EXR based on slab PhCs, according to claim 1 in which said high-refractive-index dielectric is silicon, gallium arsenide, titanium dioxide or a different dielectric having a refractive index of more than 2.

6. The TMOS with a high EXR based on slab PhCs, according to claim 1 in which said low-refractive-index dielectric is vacuum, air, cryolite, silica, organic foam, olive oil or a different dielectric having a refractive index of less than 1.5.

7. The TMOS with a high EXR based on slab PhCs, according to claim 6 in which said low-refractive-index dielectric is air.

8. The TMOS with a high EXR based on slab PhCs, according to claim 1 in which the frequency range of said TMOS is 0.4 to 0.49, an state that said first square-lattice slab PhC is located in an optical channel (OCH) and said second square-lattice slab PhC is located outside the OCH is the optically connected state; and another state that said second square-lattice slab PhC is located in the OCH and said first square-lattice slab PhC is located outside the OCH is the optically disconnected state.

9. The TMOS with a high EXR based on slab PhCs, according to claim 1 in which said frequency range of the TMOS is 0.405 to 0.457, bandwidth is 0.0517 and EXR is −42 dB to −57 dB.

10. The TMOS with a high EXR based on slab PhCs, according to claim 1 in which positions of said first and second square-lattice slab PhC in the OC Hs are adjusted by external forces, including mechanical, electrical and magnetic forces.

* * * * *